(12) United States Patent
Kim

(10) Patent No.: US 10,173,591 B2
(45) Date of Patent: Jan. 8, 2019

(54) LASER-BASED WARNING SYSTEM FOR VEHICLE

(71) Applicant: Jun-Gu Kim, Seoul (KR)

(72) Inventor: Jun-Gu Kim, Seoul (KR)

( * ) Notice: Subject to any disclaimer, the term of this patent is extended or adjusted under 35 U.S.C. 154(b) by 0 days.

(21) Appl. No.: 15/827,483

(22) Filed: Nov. 30, 2017

(65) Prior Publication Data

US 2018/0201189 A1 Jul. 19, 2018

(30) Foreign Application Priority Data

Jan. 13, 2017 (KR) ........................ 10-2017-0005967

(51) Int. Cl.
| | | |
|---|---|---|
| *B60Q 9/00* | (2006.01) | |
| *B60W 50/14* | (2012.01) | |
| *G02B 27/01* | (2006.01) | |
| *B60K 35/00* | (2006.01) | |
| *B60Q 1/50* | (2006.01) | |
| *B60Q 1/52* | (2006.01) | |
| *B60Q 3/12* | (2017.01) | |
| *G08G 1/16* | (2006.01) | |

(52) U.S. Cl.
CPC .............. *B60Q 9/008* (2013.01); *B60K 35/00* (2013.01); *B60Q 1/50* (2013.01); *B60Q 1/525* (2013.01); *B60Q 3/12* (2017.02); *B60W 50/14* (2013.01); *G02B 27/01* (2013.01); *B60K 2350/1084* (2013.01); *B60K 2350/1096* (2013.01); *G08G 1/166* (2013.01)

(58) Field of Classification Search
None
See application file for complete search history.

(56) References Cited

U.S. PATENT DOCUMENTS

| | | | |
|---|---|---|---|
| 7,681,501 B1 | 3/2010 | Wishert | |
| 7,859,391 B1* | 12/2010 | Solis | B60Q 1/503 340/425.5 |
| 2007/0053195 A1* | 3/2007 | Alberti | B60Q 1/2665 362/494 |
| 2008/0238640 A1* | 10/2008 | Mori | B60Q 9/00 340/435 |
| 2012/0089273 A1* | 4/2012 | Seder | B60Q 1/268 701/2 |
| 2015/0168721 A1* | 6/2015 | Yamasaki | G02B 27/0101 345/7 |
| 2016/0288644 A1* | 10/2016 | Bochenek | B60K 35/00 |
| 2017/0210282 A1* | 7/2017 | Rodriguez Barros | G03B 21/00 |

\* cited by examiner

*Primary Examiner* — Chico A Foxx
(74) *Attorney, Agent, or Firm* — Paratus Law Group, PLLC

(57) ABSTRACT

A laser-based warning system for a vehicle, the system including: a laser device located on an inner face of a ceiling of a vehicle frame; and a controller configured to generate an emergency message and send the message to the laser device, wherein the laser device is configured to receive the emergency message and to shape a laser based on the message to irradiate the laser-based message onto a front, left, right, rear glasses of the vehicle selectively.

8 Claims, 5 Drawing Sheets

LASER-BASED WARNING SYSTEM FOR VEHICLE

CROSS-REFERENCE TO RELATED APPLICATION

This application claims the benefit of Korea patent application No. 10-2017-0005967 filed on Jan. 13, 2017, the entire content of which is incorporated herein by reference for all purposes as if fully set forth herein.

BACKGROUND

The present disclosure relates to a laser based warning system for a vehicle, wherein the laser beam generator emits a laser beam as a warning message on the windshield and rear window of the vehicle in response to the emergency, to alert the front and rear vehicles of the emergency and to prevent accident proactively.

Accidents frequently occur when parking and stopping on the lateral shoulder of the road. Second and third chain-collision accidents occur frequently when the vehicle is out of main road lines on a highway, then is stopping or parking on the shoulder lane, the backward car breaks down or crashes into the front vehicle on the lateral shoulder of a road. As a result, it is time-consuming to install safety equipment on the road, which raises additional risks.

As one prior art, U.S. Pat. No. 7,681,501 B1 discloses emergency flare case and stand and method of use thereof, wherein the invention discloses a container and support stand for conventional road flares, thereby allowing said stand to support flares during use. The device consists of multiple round flare holders or tubes, which are snapped around a central core holder. The core holder will accommodate four (4) to six (6) flares dependent upon the model. Each flare tube has a waterproof cap. To use, a person would select one or more flare tubes from the central core, remove each cap, and slide out the flare. A locking system to prevent the flare from falling all of the way back into the tube is then activated, along with a spring-levered two-foot support stand. The stand is then deployed with the flare ignited and dropped into the tube. When finished, the spent flare can be discarded, a new one placed in the holder, the cap replaced, and the holder snapped back into the central core holder, thus making the device ready for the next use.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure is intended to solve the above problems and to provide a warning message in case of an accident or danger by expressing an emergency situation with laser light before or during an emergency stop on the shoulder.

In one aspect of the present disclosure, there is provided a laser-based warning system for a vehicle, the system including: a laser device located on an inner face of a ceiling of a vehicle frame; and a controller configured to generate an emergency message and send the message to the laser device, wherein the laser device is configured to receive the emergency message and to shape a laser based on the message to irradiate the laser-based message onto a front, left, right, rear glasses of the vehicle selectively.

In one embodiment, the controller is configured to generate an emergency message as an animation-based warning message, wherein the laser device is configured to shape a laser based on the animation-based message to irradiate the animation-based laser-based message onto a front, left, right, rear glasses of the vehicle selectively.

In one embodiment, the controller is integrated in the dash board of the vehicle.

In one embodiment, the controller is incorporated in a mobile communication device such that the controller communicates with the laser device via a wireless manner.

In one embodiment, the controller is incorporated in a portable vehicle manual operation key such that the controller communicates with the laser device via a wireless manner.

In one embodiment, the laser device is embodied as a beam projector.

In one embodiment, the controller is configured to select a color of the message to be displayed on the glass.

In one embodiment, the controller is configured to select a direction of a laser beam to be irradiated.

In one embodiment, the controller is configured to select a intensity of a laser beam to be irradiated.

As described above, the present disclosure can express the warning message of automobile as a laser, so that the message can be expressed clearly without being affected by the ambient light without the surrounding light or the reflection device, so that the warning message can be transmitted safely and promptly to the front and rear vehicle It is possible to effectively display the effect of preventing an accident.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

Figure 1:
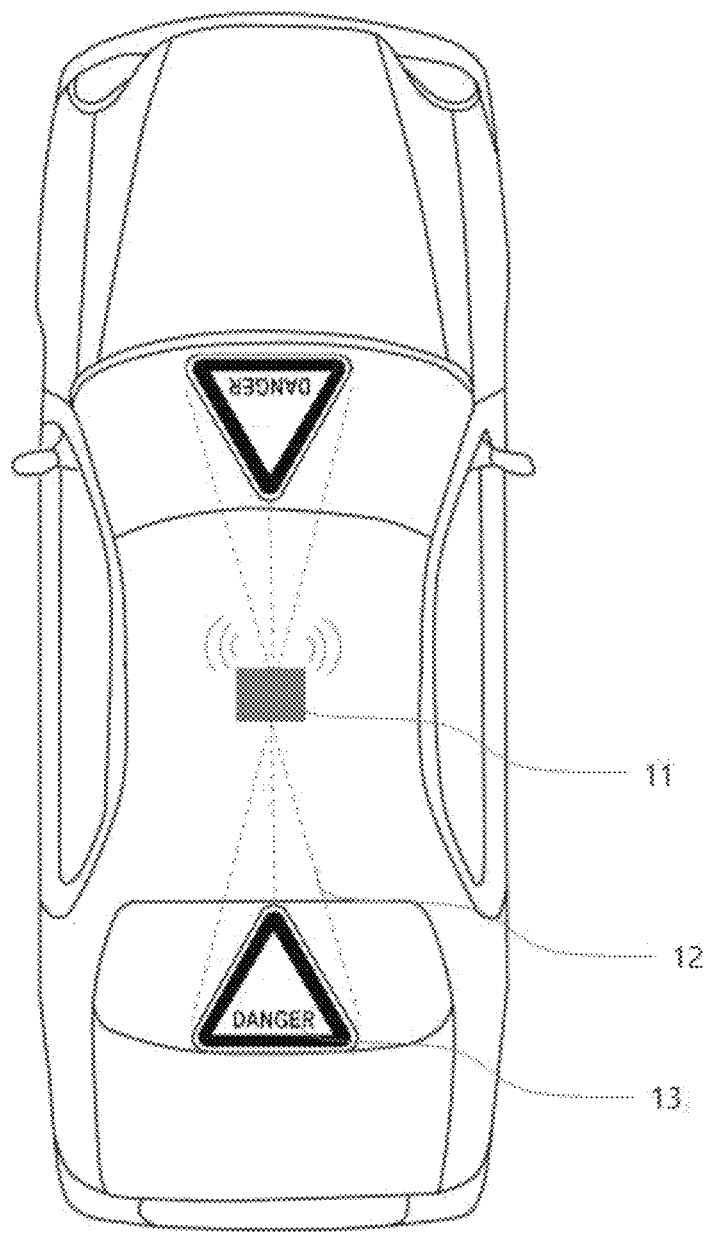
FIG. 1 is a first use state diagram of the laser-based warning device for a vehicle according to an embodiment of the present disclosure.

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

DETAILED DESCRIPTION

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Spatially relative terms, such as "beneath," "below," "lower," "under," "above," "upper," and the like, may be used herein for ease of explanation to describe one element or feature's relationship to another element s or feature s as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

Figure 2:
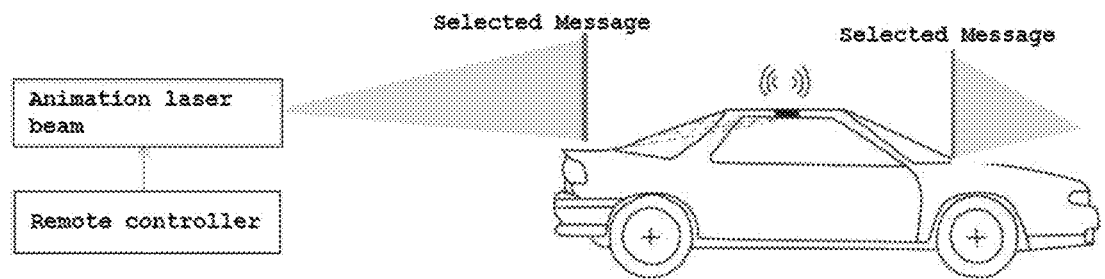
FIG. 2 illustrates an example of the operation of the laser-based warning device for a vehicle according to an embodiment of the present disclosure.
Figure 3:
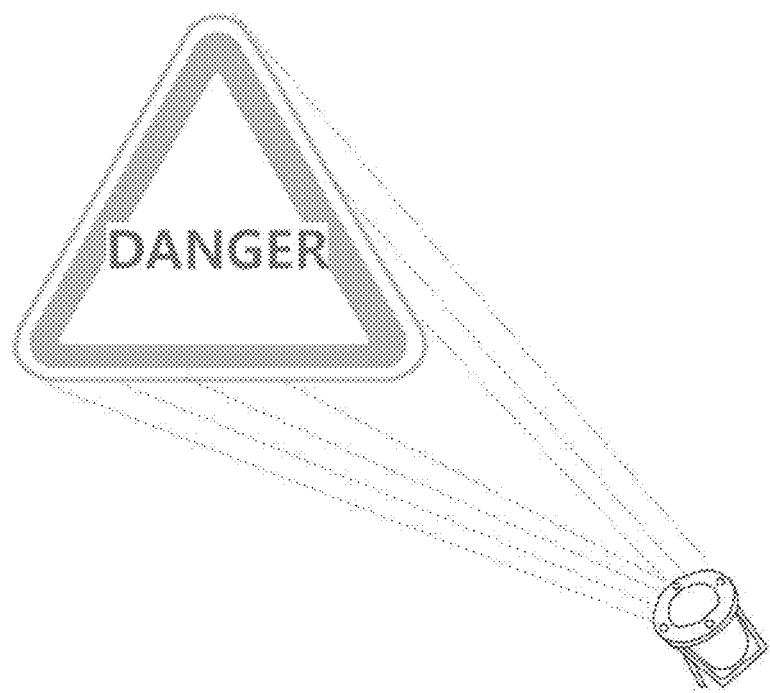
FIG. 3 illustrates the operation of the laser-based animation-based warning device for a vehicle of the laser-based warning device for a vehicle according to an embodiment of the present disclosure.
Figure 4:
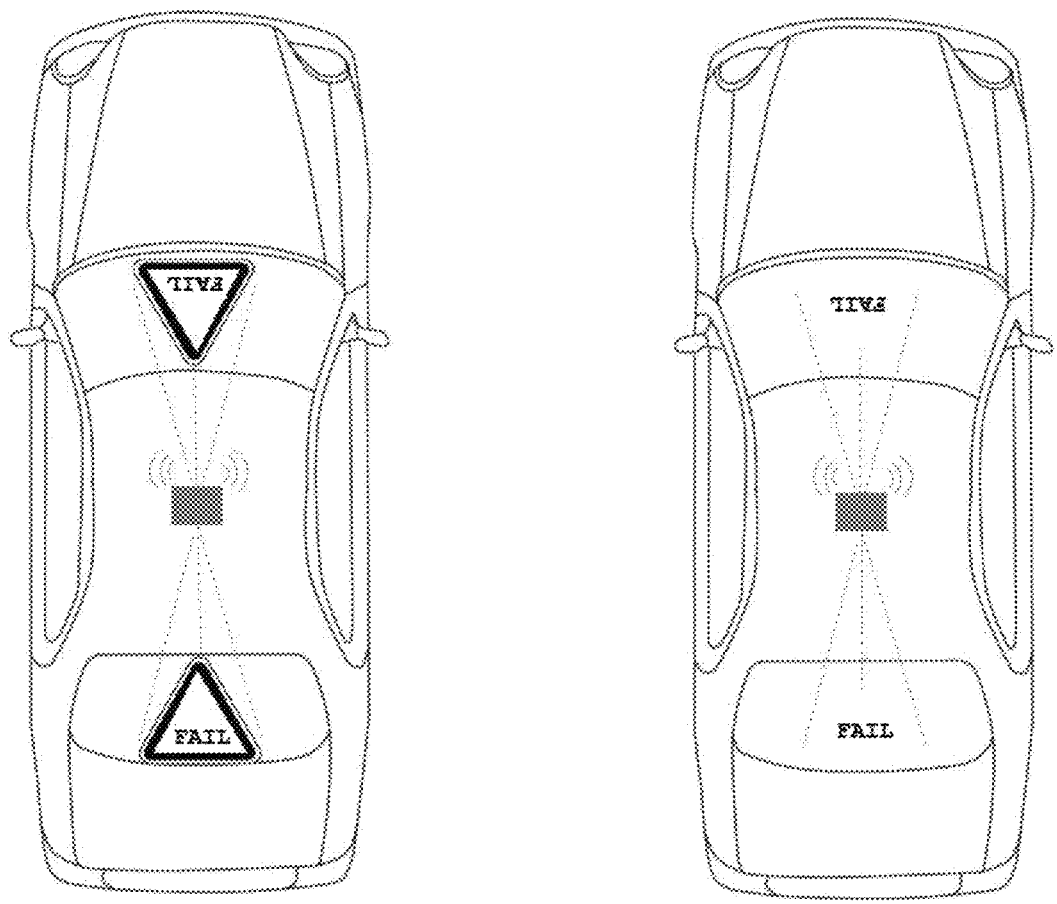
FIG. 4 is a second use state diagram of the laser-based warning device for a vehicle according to an embodiment of the present disclosure.
Figure 6:
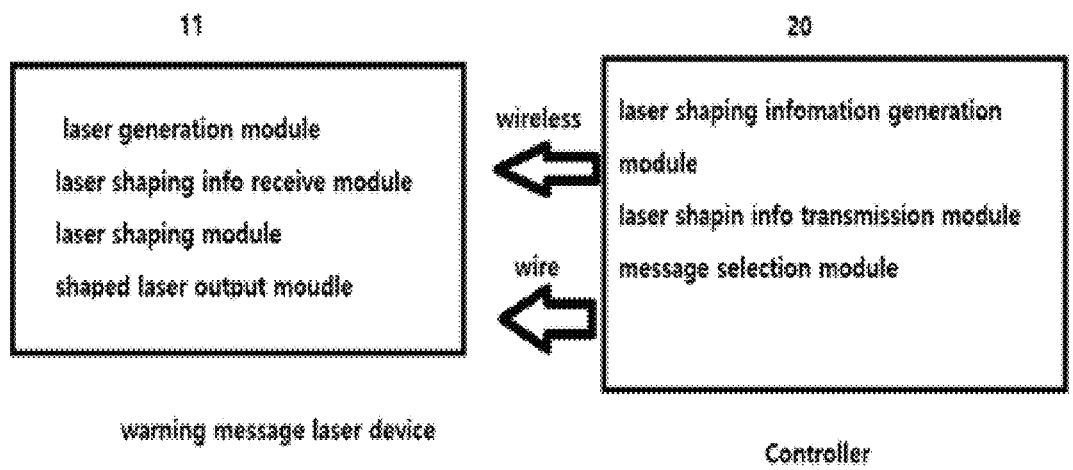
FIG. 6 is a block diagram to illustrate operation modules to implement the present invention.

FIG. 1 shows a plan view of a laser-based warning device for a vehicle according to an embodiment of the present disclosure. FIG. 2 is an explanatory view of the installation of the laser-based warning device for a vehicle according to an embodiment of the present disclosure. FIG. 3 is an explanatory diagram of the laser-based animation-based warning device for a vehicle implementation of the laser-based warning device for a vehicle according to an embodiment of the present disclosure. FIG. 4 is an exemplary embodiment of the fail message processing via the laser-based warning device for a vehicle according to an embodiment of the present disclosure. FIG. 4 is an exemplary embodiment of the theft message processing via the laser-based warning device for a vehicle according to an embodiment of the present disclosure. FIG. 6 is a block diagram to illustrate operation modules to implement the present invention.

The laser-based animation-based warning device 11 for a vehicle irradiates the laser 12 to the front glass and the rear glass of the vehicle so that the selection message laser 13 is projected onto the front glass and the rear glass.

The light emission of the laser can be simultaneously emitted toward the front face toward the rear face. According to the user's demand, it is possible to select either front or rear direction to emit light. According to the description of FIG. 1, in the present disclosure, the installation position of the laser-based animation-based warning device for a vehicle 11 may be located on the inner bottom face of the vehicle ceiling. The size of the selected message laser 13 generated by the laser-based animation-based warning device for a vehicle 11 may be adjusted in accordance with the sizes of the front glass and the rear glass of the vehicle.

The position of the laser-based animation-based warning device 11 for a vehicle installed in the vehicle is not limited to the inner bottom of the vehicle ceiling, and can be installed according to the user's requirements, The laser-based warning device for a vehicle may have the form of a mini-laser-based animation-based warning device for a vehicle of FIG. 1. The size and shape of the device may vary depending on the application and structure of the vehicle.

The warning message for the laser-based warning device for a vehicle can be selected from a computer or a mobile phone. The computer or cellular phone may be wired or wirelessly communicating with the laser-based animation-based warning device for a vehicle.

The content of the selected message 13 is changed using a remote controller of a cellular phone or a car key or a separate remote controller, and further, it can be irradiated forward or backward. That is, there are various user friendly control means for controlling message activation.

Figure 5:
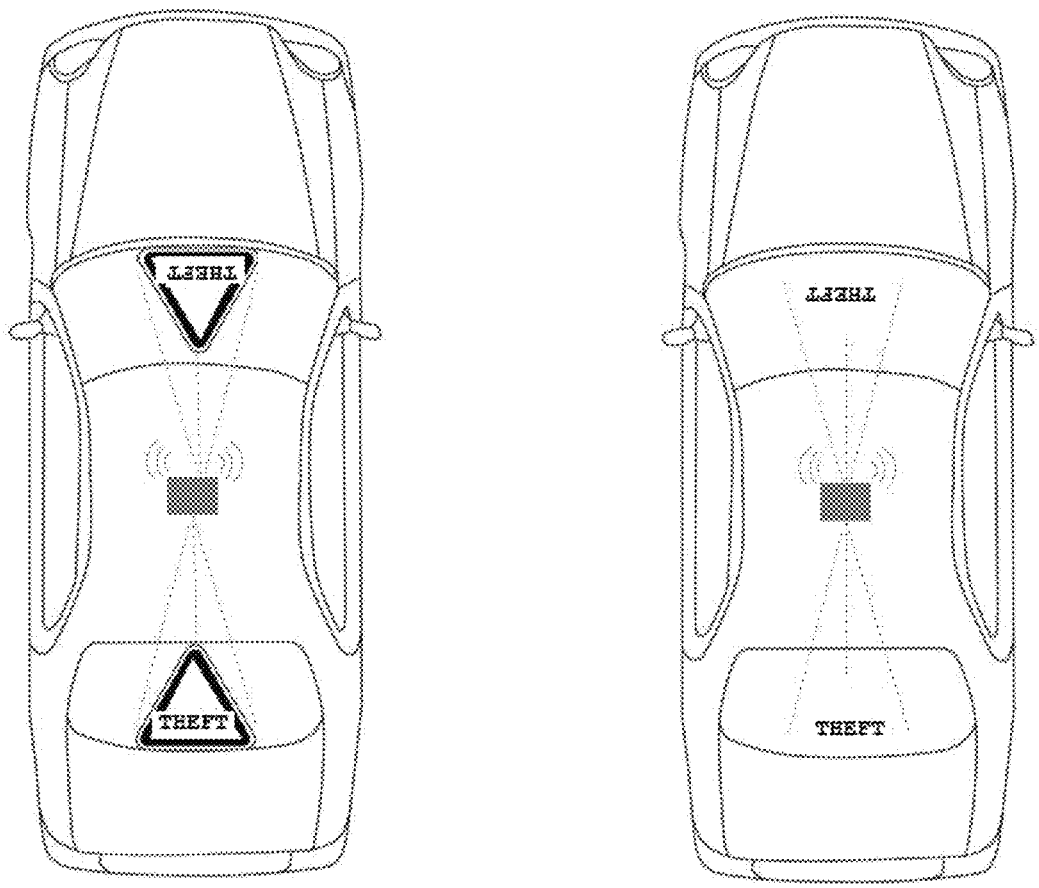
FIG. 5 is a third use state diagram of the laser-based warning device for a vehicle according to an embodiment of the present disclosure.

The laser-based warning device for a vehicle displays a theft message as shown in FIG. 5. The emergency message is limited thereto. For example, "tire flat" message may be possible.

This function is configured to send a warning message according to the setting of the car key or the mobile phone when the car key is lost, the warning bell rings, or someone else forcibly opens the door. This prevents additional loss. The manner in which the laser message is irradiated and the time it is irradiated and the means by which the irradiation is activated may vary depending on the application and the structure of the vehicle.

The selection message laser 13 is characterized by blinking the border and letters repeatedly at a predetermined speed in a short time, thereby allowing the rear vehicle to quickly detect it.

The color of the selection message laser 13 implemented is basically green and red. However, when an animation content technology capable of transmitting a three-dimensional moving image of a color is combined with a three-dimensional structure, it is possible to implement moving images of various colors. Animation messages can be realized in the 3-dimension.

FIG. 6 is a block diagram to illustrate operation modules to implement the present invention. In operation, the laser-based animation-based warning device 11 may receive laser shaping information from the controller and generate the laser-based message based on the received shaping information, and output the shaped laser-based message to a front vehicle glass and/or a rear vehicle glass. In order to perform the functions, the laser device 11 includes a laser generation module, laser shaping information receive module, a laser shaping module and a shaped laser output module. In this connection, the user controller may include a laser shaping information generation module, laser shaping information transmission module, and message selection module.

Further, the user controller may further include a laser irradiation direction determination module for determining in which direction the laser output is to be irradiated toward the front of the vehicle or behind the vehicle. The user controller also includes a laser color selection module that can select the color of the laser. The laser molding refers to a process for imparting an animation effect.

As described above, the present disclosure can express the warning message of automobile as a laser, so that the message can be expressed clearly without being affected by the ambient light without the surrounding light or the reflection device, so that the warning message can be transmitted safely and promptly to the front and rear vehicle It is possible to effectively display the effect of preventing an accident.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by an access terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that an access terminal and/or base station can obtain the various methods upon coupling or providing the storage means to the device. Moreover, any other suitable technique for providing the methods and techniques described herein to a device can be utilized.

Various items may be arranged differently (for example, arranged in a different order, or partitioned in a different way) all without departing from the scope of the subject technology. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although the technical idea of the present disclosure has been specifically described according to the above preferred embodiments, it should be noted that the above-mentioned embodiments are for illustrative purposes only and not limitative of the above-described embodiments. It will be understood by those of ordinary skill in the art of the present disclosure that various embodiments are possible within the scope of the technical idea of the present disclosure.

What is claimed is:

1. A laser-based warning system for a vehicle, the system including:
    a laser device located on an inner face of a ceiling of a vehicle frame and configured to simultaneously irradiate light onto front and rear glasses of the vehicle; and
    a controller configured to generate an emergency message and send the emergency message to the laser device,
    wherein the laser device is configured to receive the emergency message and to shape a laser based on the message to irradiate the laser-based message onto both of the front and rear glasses of the vehicle,
    wherein the controller is configured to communicate with at least one of a mobile phone and a computer which selects a content of the emergency message and adjusts a size of the emergency message according to a user's selection.

2. The system of claim 1, wherein the controller is configured to generate the emergency message as an animation-based warning message.

3. The system of claim 1, wherein the controller is integrated in the dash board of the vehicle.

4. The system of claim 1, wherein the controller is incorporated in a mobile communication device such that the controller communicates with the laser device via a wireless manner.

5. The system of claim 1, wherein the controller is incorporated in a portable vehicle manual operation key such that the controller communicates with the laser device via a wireless manner.

6. The system of claim 1, wherein the laser device is embodied as a beam projector.

7. The system of claim 1, wherein the controller is configured to select a color of the message to be displayed on the glass.

8. The system of claim 1, wherein the controller is configured to select an intensity of a laser beam to be irradiated.

* * * * *